US008791619B2

(12) United States Patent  (10) Patent No.: US 8,791,619 B2
Tanimoto  (45) Date of Patent: Jul. 29, 2014

(54) DISC MOTOR AND ELECTRIC WORKING MACHINE EQUIPPED WITH DISC MOTOR

(75) Inventor: Hideyuki Tanimoto, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 294 days.

(21) Appl. No.: 13/237,135

(22) Filed: Sep. 20, 2011

(65) Prior Publication Data

US 2012/0080971 A1    Apr. 5, 2012

(30) Foreign Application Priority Data

Sep. 30, 2010  (JP) ................................. 2010-221956

(51) Int. Cl.
  *H02K 1/22*  (2006.01)
(52) U.S. Cl.
  USPC .......................................... 310/268; 310/198
(58) Field of Classification Search
  USPC .................. 310/268, 208, 198, 207
  See application file for complete search history.

(56) References Cited

U.S. PATENT DOCUMENTS

| | | | |
|---|---|---|---|
| 5,177,389 A | | 1/1993 | Schalk |
| 6,040,650 A | * | 3/2000 | Rao ................................ 310/268 |
| 7,375,449 B2 | * | 5/2008 | Butterfield ..................... 310/207 |
| 7,573,173 B1 | * | 8/2009 | Frownfelter .................... 310/208 |
| 8,058,762 B2 | * | 11/2011 | Asano ........................ 310/156.33 |
| 8,193,678 B2 | * | 6/2012 | Horng et al. .................. 310/208 |
| 8,476,800 B2 | * | 7/2013 | Lai et al. ........................ 310/179 |
| 2003/0015925 A1 | | 1/2003 | Pullen et al. |
| 2003/0020353 A1 | | 1/2003 | Lopatinsky et al. |
| 2007/0216249 A1 | | 9/2007 | Gruendel et al. |

FOREIGN PATENT DOCUMENTS

| | | |
|---|---|---|
| CN | 1520632 A | 8/2004 |
| JP | 3636700 | 4/2005 |
| JP | 2010-011550 A | 1/2010 |

OTHER PUBLICATIONS

Chinese Office Action, w/ English translation thereof, issued in Chinese Patent Application No. CN 201110275361.3 dated Sep. 2, 2013.

* cited by examiner

*Primary Examiner* — Hanh Nguyen
(74) *Attorney, Agent, or Firm* — McDermott Will & Emery LLP (57) ABSTRACT

A disc motor includes an output shaft, a coil disc, an electric current supplying section, and a magnet. The coil disc is disc-shaped. The coil disc includes a first coil and a second coil. The first coil has a plurality of first partial coil sections radiating outward in a radial direction of the output shaft and first connecting sections each connecting two first partial coil sections. The second coil has a plurality of second partial coil sections radiating outward in the radial direction and second connecting sections each connecting two second partial coil sections. The total number of the first partial coil sections is different from that of the second partial coil sections. The electric current supplying section is configured to supply electric current to the coil disc. The magnet is disposed in opposition to the first and second partial coil sections.

6 Claims, 8 Drawing Sheets

| | FIRST DISC MOTOR | SECOND DISC MOTOR | DISC MOTOR 3 | THIRD DISC MOTOR | FOURTH DISC MOTOR | FIFTH DISC MOTOR |
|---|---|---|---|---|---|---|
| NUMBER OF LINEAR PART WITHIN FIRST COIL DISC | 40 | 80 | 40 | 120 | 40 | 40 |
| NUMBER OF LINEAR PART WITHIN SECOND COIL DISC | 40 | 80 | 40 | 120 | 40 | 80 |
| NUMBER OF LINEAR PART WITHIN THIRD COIL DISC | 40 | 80 | 40 | 120 | 80 | 80 |
| NUMBER OF LINEAR PART WITHIN FOURTH COIL DISC | 40 | 80 | 80 | 120 | 80 | 80 |
| TOTAL NUMBER OF LINEAR PARTS | 160 | 320 | 200 | 480 | 240 | 280 |
| ROTATING SPEED | 100 | 50 | 80 | 33 | 67 | 57 |
| ROTATING SPEED REDUCTION RATE | 0 | 50% | 20% | 67% | 33% | 43% |

|  | FIRST DISC MOTOR | SIXTH DISC MOTOR | SEVENTH DISC MOTOR |
|---|---|---|---|
| NUMBER OF LINEAR PART WITHIN FIRST COIL DISC | 40 | 40 | 40 |
| NUMBER OF LINEAR PART WITHIN SECOND COIL DISC | 40 | 40 | 60 |
| NUMBER OF LINEAR PART WITHIN THIRD COIL DISC | 40 | 40 | 60 |
| NUMBER OF LINEAR PART WITHIN FOURTH COIL DISC | 40 | 60 | 60 |
| TOTAL NUMBER OF LINEAR PARTS | 160 | 180 | 220 |
| ROTATING SPEED | 100 | 89 | 73 |
| ROTATING SPEED REDUCTION RATE | 0 | 11% | 27% |

US 8,791,619 B2

DISC MOTOR AND ELECTRIC WORKING MACHINE EQUIPPED WITH DISC MOTOR

CROSS REFERENCE TO RELATED APPLICATION

This application claims priority from Japanese Patent Application No. 2010-221956 filed Sep. 30, 2010. The entire content of this priority application is incorporated herein by reference.

TECHNICAL FIELD

The present invention relates to a rotor, a disc motor, and an electric working machine equipped with the disc motor.

BACKGROUND

One type of conventional disc motor well-known in the art, such as that disclosed by Japanese Patent No. 3636700, mainly includes an output shaft, a substantially disc-shaped coil disc fixed to the output shaft and printed with a coil pattern which is formed of a plurality of coils, a commutator connected to the coils, a magnet disposed in opposition to the coils, and blushes for conducting an electric current to the commutator.

The rotating speed of the disc motor depends on the electric voltage conducted through the blushes, an electric current flowing to the disc motor, the coil pattern printed on the coil disc, a magnetic flux, the number of brushes (poles), and the like. When the electric voltages supplied through the brushes and the electric current flowing through the disc motor are constant, it is possible to set a desired rotating speed of the disc motor by changing the coil pattern of the coil disc, the magnetic flux, and the number of blushes.

In order to achieve a desired rotating speed of the disc motor, coil patterns of all coils are changed.

SUMMARY

However, changing the coil patterns of all coils greatly changes the rotating speed. For example, the rotating speed can be changed by increasing the winding number of all coils (increasing the number of coils disposed across the path of the magnetic flux). In this case, the rotating speed of the disc motor decreases to a great extent, and it is unable to finely change the rotating speed. Since it is difficult to achieve a desired rotating speed by changing the coil patterns, freedom in designing the disc motor is limited.

In view of the foregoing, it is an object of the present invention to provide a rotor and a disc motor with improved design freedom, and an electric working machine equipped with the disc motor.

In order to attain the above and other objects, the present invention provides a disc motor. The disc motor includes an output shaft, a coil disc, an electric current supplying section, and a magnet. The coil disc is substantially disc-shaped. The coil disc includes a first coil and a second coil. The first coil has a plurality of first partial coil sections radiating outward in a radial direction of the output shaft and first connecting sections each connecting two first partial coil sections. The second coil has a plurality of second partial coil sections radiating outward in the radial direction and second connecting sections each connecting two second partial coil sections. The first partial coils provide a total number different from that of the second partial coils. The electric current supplying section is configured to supply an electric current to the coil disc. The magnet is disposed in opposition to the first partial coil sections and the second partial coil sections.

According to another aspect, the present invention provides an electric working machine. The electric working machine includes a disc motor as described above.

According to still another aspect, the present invention provides a rotor used in a disc motor. The rotor includes an output shaft and a coil disc. The coil disc is substantially disc-shaped. The coil disc includes a first coil and a second coil. The first coil has a plurality of first partial coil sections radiating outward in a radial direction of the output shaft and first connecting sections each connecting two first partial coil sections. The second coil has a plurality of second partial coil sections radiating outward in the radial direction and second connecting sections each connecting two second partial coil sections. A total number of the first partial coil sections is different from a total number of the second partial coil sections.

With this configuration, the number of first and second partial coil sections on the coil disc can be freely changed. This enables fine control of the rotating speed of disc motor, greatly improving the freedom in designing the disc motor.

According to the present invention, a rotor and a disc motor those improved design freedom, and an electric working machine equipped with the disc motor can be achieved.

BRIEF DESCRIPTION OF THE DRAWINGS

The particular features and advantages of the invention as well as other objects will become apparent from the following description taken in connection with the accompanying drawings, in which.

DETAILED DESCRIPTION

A brushcutter 1 as an example of an electric working machine according to a first embodiment of the invention will be described while referring to FIGS. 1 through 11. The brushcutter 1 mainly includes a head housing 2, a disc motor 3 (FIG. 2), a pipe section 4, a handle section 5, and a power section 6. A cutting work is performed with a cutting blade 7 mounted on the head housing 2.

The disc motor 3 is accommodated in the head housing 2, and includes an output shaft 31, a rotor 32, a stator 33, and a pair of brushes 34. The output shaft 31 is rotatably supported to the head housing 2. In the following description, an extending direction of the output shaft 31 shown in FIG. 2 will be called a "vertical direction." The cutting blade 7 is fixed to a male screw 31A formed at a lower end of the output shaft 31 by an attachment (not shown).

Figure 2:
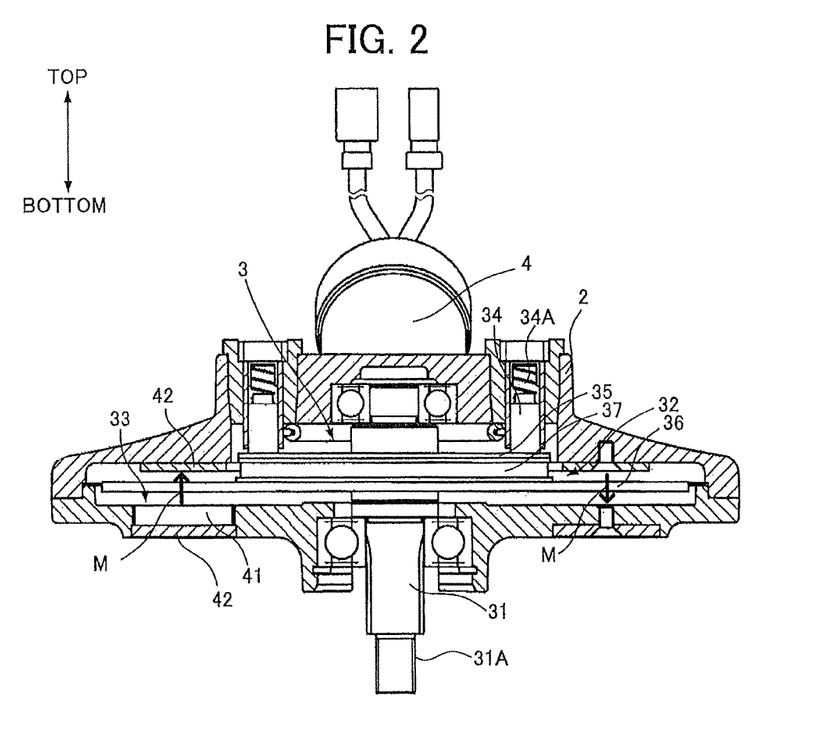
FIG. 2 is a cross-sectional view of a head housing of the electric working machine according to the first embodiment of the invention.
Figure 3:
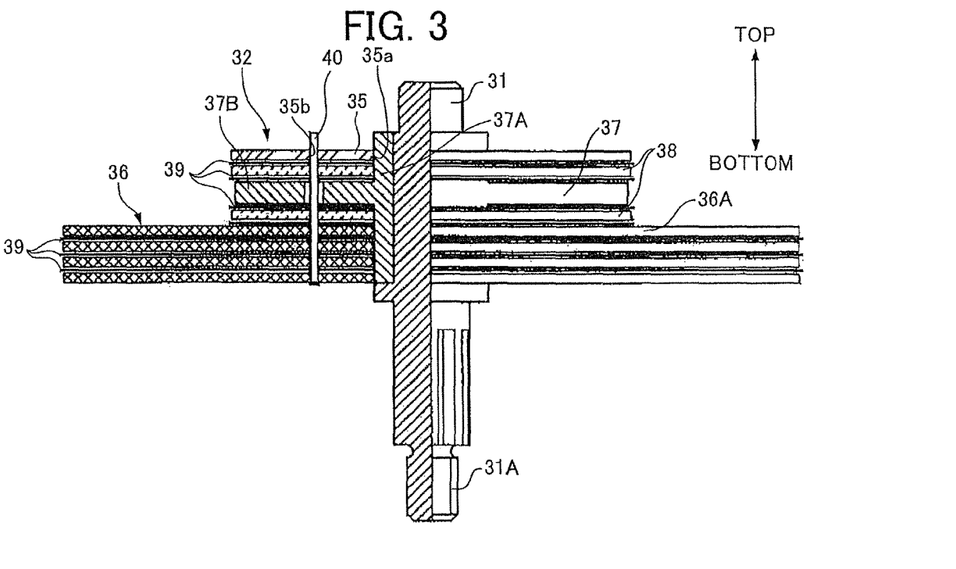
FIG. 3 is a partially cross-sectional view of a disc motor of the electric working machine according to the first embodiment of the invention.

As shown in FIGS. 2 and 3, the rotor 32 includes a commutator substrate 35 provided with a commutator (not shown), a coil section 36, a flange 37, insulating plates 38, and insulating sheets 39. The commutator substrate 35 is substantially disc-shaped and coaxially fixed to the flange 37 such that a shaft center of the commutator substrate 35 matches a shaft center of the output shaft 31. The commutator substrate 35 is formed with an insertion hole 35a at the center thereof for receiving the output shaft 31, and pin holes 35b for receiving respective pins 40 at positions a prescribed distance from the center thereof. The pins 40 penetrate through the commutator substrate 35, the coil section 36, the flange 37, the insulating plates 38, and the insulating sheets 39, which are attached to one another.

Figure 5:
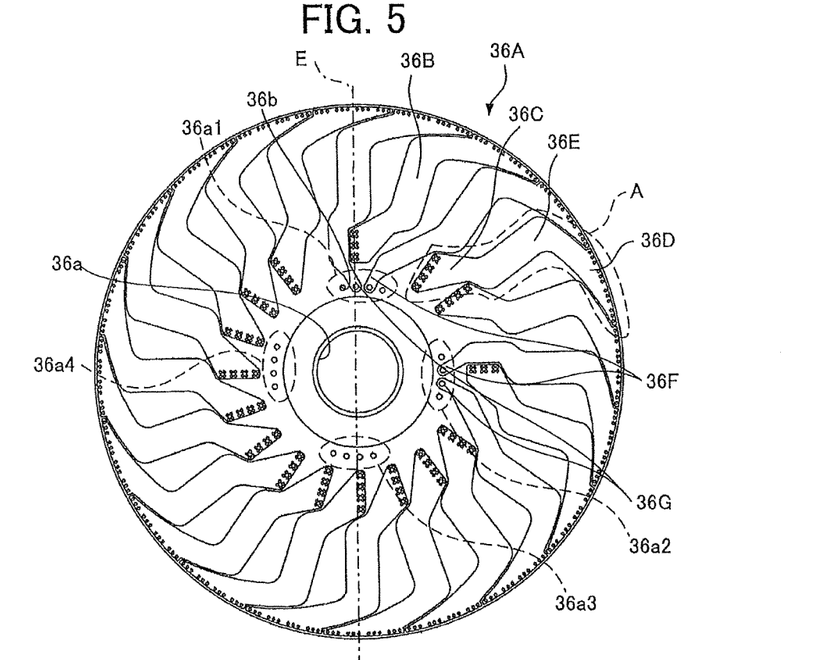
FIG. 5 is a rear view of the first coil disc according to the first embodiment of the invention.

The coil section 36 is configured by laminating and adhering four substantially disc-shaped coil discs 36A one on the other. Each coil disc 36A has upper and lower surfaces that extend perpendicular to the output shaft 31, and each of the upper and lower surfaces forms a layer provided with a coil 36B in a flat-plate shape (FIG. 5). That is, the coil section 36 is configured of the four coil discs 36A in an eight-layer structure. Details will be described later.

The flange 37 is coaxially fixed to the output shaft 31, and includes a cylinder part 37A substantially cylinder-shaped and a disc part 37B substantially disc-shaped (FIG. 3). The disc part 37B is provided to protrude radially outward from the cylinder part 37A and sandwiched between the insulating plates 38 in the vertical direction. The disc part 37B is provided for reinforcing the rotor 32. The pins 40 penetrate through each member as described above, thereby electrically connecting the commutator substrate 35 to each coil 36B. An insulating layer is provided between an outer periphery of each pin 40 and the flange 37. Each of the insulating sheets 39 is disposed between adjacent coil discs 36A and between the disc part 37B and the insulating plate 38.

The stator 33 is configured of magnets 41 and a yoke 42 (FIG. 2). The magnets 41 are supported to the head housing 2 and disposed in a circular arrangement about a through hole 36a (as indicated by dotted line in FIG. 10) so as to oppose linear parts 36E of the coils 36B described later such that any adjacent two of the magnets 41 have opposite polarities. The yoke 42 is supported to the head housing 2 and disposed around the magnets 41 for improving the magnetic force of the magnets 41. Magnetic fluxes generated by the magnets 41 pass through the coil section 36 either in the upward or downward direction as indicated by arrows M in FIG. 2. An electric current supplied through the brushes 34 to the coil section 36 flows through the coils 36B, which are disposed on the coil discs 36A and extending perpendicular to the directions of the magnetic fluxes. This generates torque in the coil section 36 in the circumferential direction of the output shaft 31 to rotate the rotor 32.

As shown in FIG. 2, the pair of brushes 34 are disposed one on either side of the output shaft 31 and supported to the head housing 2. Each of the brushes 34 is urged toward the commutator substrate 35 (downward) by a spring 34A such that a lower end of the brush 34 contacts the commutator (not shown) on the commutator substrate 35.

Figure 1:
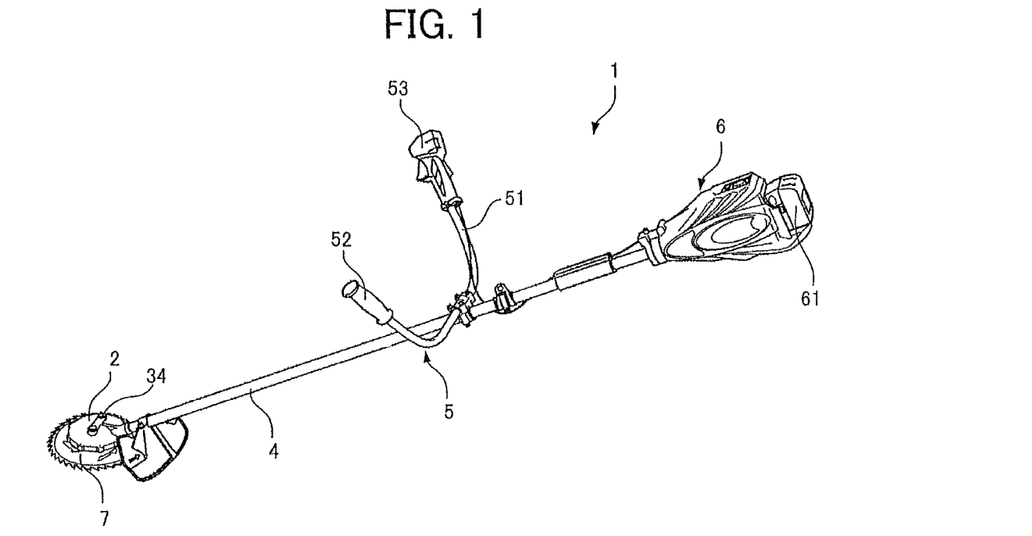
FIG. 1 is an external view of an electric working machine according to a first embodiment of the invention.

As shown in FIG. 1, the pipe section 4 connects between the head housing 2 and the power section 6, and supports the handle section 5 at a position between the head housing 2 and the power section 6.

The handle section 5 includes an arm 51 having a pair of arm sections, a pair of handles 52 disposed on ends of the arm sections, and a throttle 53 disposed on one of the handles 52 for controlling output power of the disc motor 3.

The power section 6 is detachably provided with a battery 61 as a power source to provide electric power to the disc motor 3. A wiring for conducting electric power from the battery 61 to the brushes 34 is inserted through the pipe section 4. The power section 6 of the embodiment corresponds to an electric current supplying section of the invention.

The cutting blade 7 is substantially disc-shaped, formed with saw teeth on its periphery, and formed with a hole (not shown) at substantially the center of the disc shape for mounting on the output shaft 31.

An operator can operate the throttle 53 to control electric power to be supplied from the battery 61 to the coils 36B. The electric power supplied to the coils 36B rotates the disc motor 3, and the rotary power of the disc motor 3 is transmitted to the output shaft 31 to rotate the cutting blade 7. The rotating speed of the disc motor 3 at this time will be described later.

Next, the structure of the coil section 36 will be described in greater detail with reference to FIGS. 4 to 11. The coil section 36 is configured of the four coil discs 36A. More specifically, the coil section 36 is configured by laminating three first coil discs 36A shown in FIGS. 4 to 6 and one second coil disc 36A shown in FIGS. 7 to 10.

The first coil disc 36A is formed with the through hole 36a that penetrates through the first coil disc 36A in an axial direction of the output shaft 31 for receiving the output shaft 31. The coil 36B disposed on the upper surface (FIG. 4) and the lower surface (FIG. 5) of the first coil disc 36A radiates outward in a radial direction of the first coil disc 36A. The coil 36B is a continuous coil having one end 36F and the other end 36G as shown in FIG. 5. The first coil disc 36A of this embodiment has two continuous coils 36B, and thus two pairs of the one end 36F and the other end 36G are disposed on the lower surface of the first coil disc 36A.

In the following description, a section encircled by a dotted line in FIGS. 4 and 5 will be referred to as a partial coil A. Twenty partial coils A are disposed on the upper surface of the first coil disc 36A, and another twenty partial coils A are disposed on the lower surface of the first coil disc 36A. This arrangement of the partial coils A forms a coil pattern on the first coil disc 36A. The coil 36B within each partial coil A is configured of an inner connection part 36C on a radially inner side, an outer connection part 36D on a radially outer side, and the linear part 36E extending linearly in the radial direction to connect the inner connection part 36C to the outer connection part 36D. The linear part 36E extending direction is orthogonal to the direction of the magnetic fluxes. The coil 36B within the partial coil A is connected to another coil 36B on the opposite surface of the coil disc 36A at the inner connection parts 36C and the outer connection parts 36D.

Figure 6:
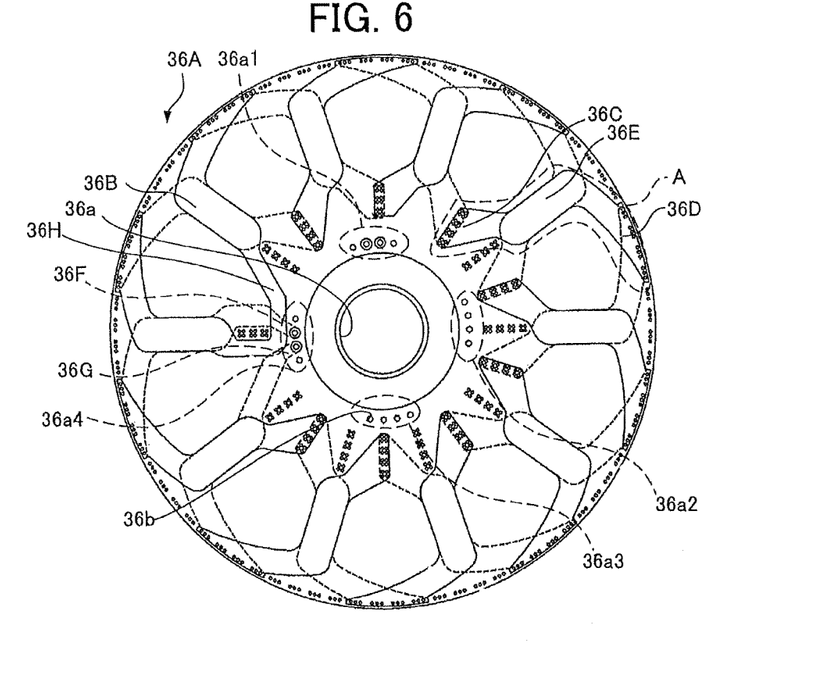
FIG. 6 is a phantom view showing one of two coils disposed on the first coil disc according to the first embodiment of the invention.

FIG. 6 only shows one of the two continuous coils 36B of the first coil disc 36A. The coil 36B on the upper surface is depicted with a solid line, and the coil 36B on the lower surface is depicted with a dotted line. The coils 36B on the upper and lower surfaces are connected to each other at a section where the inner connection parts 36C overlap with each other. Similarly, the coils 36B on the upper and lower surfaces are connected to each other at a section where the outer connection parts 36D overlap with each other. The coil 36B on the first coil disc 36A extends all the way around the first coil disc 36A one time in the circumferential direction of the coil disc 36A from the one end 36F to the other end 36G while going back and forth between the upper surface and the lower surface.

The first coil disc 36A is defined with regions 36a1, 36a2, 36a3, and 36a4 at 90-degree intervals about the through holes 36a, and is formed with four connection holes 36b aligned in a line within each of the regions 36a1, 36a2, 36a3, and 36a4. Two of the four connection holes 36b in the regions 36a1 and 36a2 are inserted with the respective pins 40 connected to either of the one end 36F and the other end 36G. With this configuration, the one end 36F and the other end 36G are electrically connected to another coil disc 36A through the pins 40.

Figure 7:
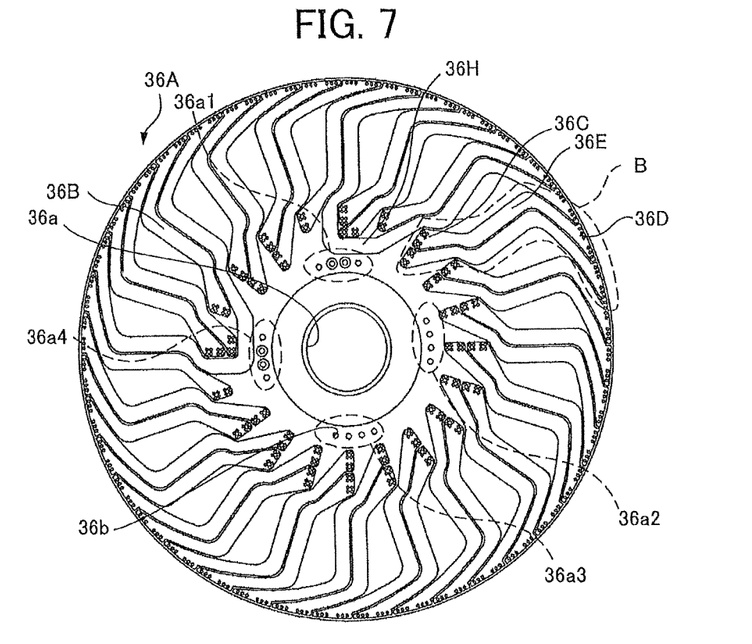
FIG. 7 is a plan view of a second coil disc according to the first embodiment of the invention.
Figure 8:
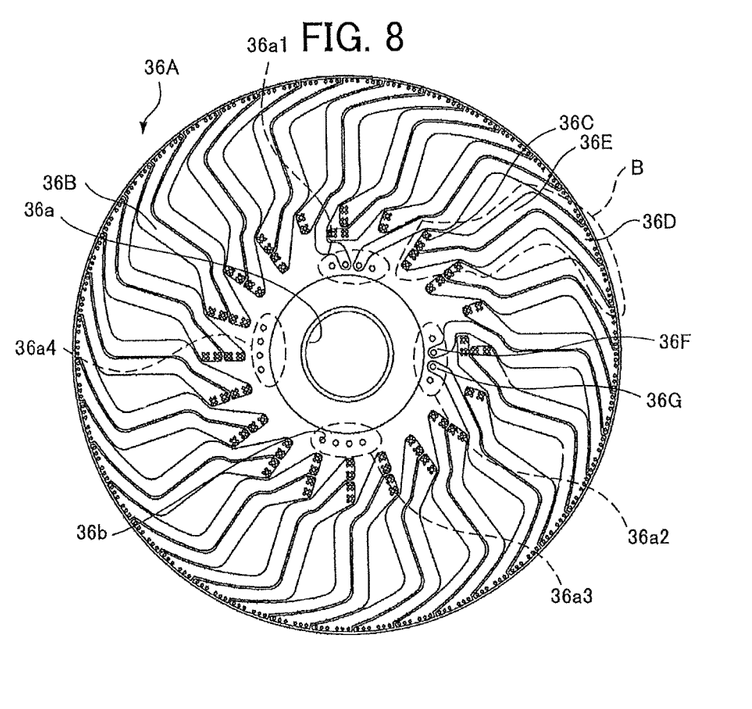
FIG. 8 is a rear view of the second coil disc according to the first embodiment of the invention.
Figure 9:
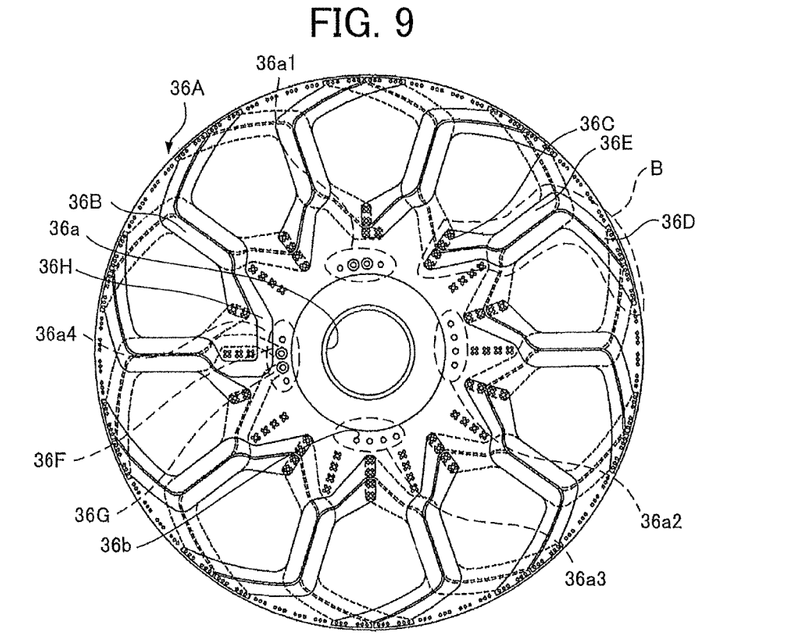
FIG. 9 is a phantom view showing one of two coils disposed on the second coil disc according to the first embodiment of the invention.
Figure 10:
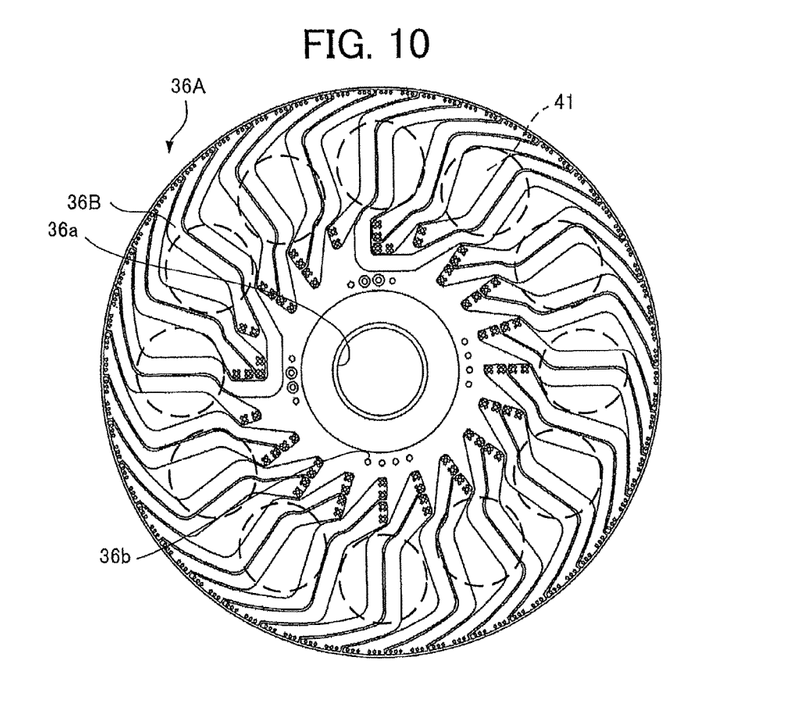
FIG. 10 is a plan view of the second coil disc showing the positional relationship between coils and magnets according to the first embodiment of the invention.

The second coil disc 36A shown in FIGS. 7 to 9 will be described. Since the arrangement of the coil 36B on the second coil disc 36A is substantially the same as the arrangement of the coil 36B on the first coil disc 36A described above, the following description will only focus on the difference. Partial coils B are defined on the second coil disc 36A. The coil 36B on the second coil disc 36A has a narrower width than the coil 36B on the first coil disc 36A. Also, the number of coils 36B within each partial coil B (two, in this embodiment) is greater than that within the partial coil A. As shown in FIG. 9, the coil 36B on the second coil disc 36A extends all the way around the second coil disc 36A twice from the one end 36F to the other end 36G. Two continuous coils 36B extend all the way around the second coil disc 36A twice, and thus two pairs of the one end 36F and the other end 36G are located on the second coil disc 36A as shown in FIG. 7.

The rotating speed of the disc motor 3 depends on the electric voltage supplied from the power section 6 to the coils 36B, an electric current flowing through the disc motor 3, the fluxes of the magnets 41, the number of brushes 34 (number of poles), the partial coils A and B, and the like. In this embodiment, the partial coil denotes a gathering of coils disposed such that a direction of electric current flowing in the partial coil is perpendicular to the direction of the magnetic fluxes generated by the magnets 41.

The present embodiment provides a configuration that enables fine control of the rotating speed of the disc motor 3 by using various coil patterns. In this example, a first disc motor having an eight-layer structure configured by laminating four first coil discs 36A shown in FIGS. 4 and 5 is compared to a second disc motor having an eight-layer structure configured by laminating four second coil discs 36A shown in FIGS. 7 and 8. The total number of conductors included in each of the first and second disc motors is in proportion to the number of the linear parts 36E aligned with the magnets 41. More specifically, the number of the linear parts 36E within all the partial coils A on the upper surface of the first coil disc 36A (FIG. 4) of the first disc motor is 20, and that on the lower surface (FIG. 5) is also 20. Thus, each of the first coil discs 36A includes the total of 40 (20+20) conductors. Since the first disc motor includes the four first coil discs 36A, the first disc motor includes the total of 160 (40×4) conductors. On the other hand, the second coil disc 36A has 40 linear parts 36E within all the partial coils B on the upper surface (FIG. 7) and another 40 linear parts 36E within all the partial coils B on the lower surface (FIG. 8). Hence, the second disc motor including the four second coil discs 36A has the total of 320 (80×4) conductors.

The rotating speed of a motor is generally in inverse proportion to the total number of conductors (the number of linear parts 36E disposed across the paths of the magnetic fluxes generated by the magnets 41 (the winding number of the coils 36B, the number of partial coils A, or the number of partial coils B)) disposed across the paths of the magnetic fluxes. Hence, a rotating speed $N_2$ of the second disc motor is half of a rotating speed $N_1$ of the first disc motor.

Figure 11:
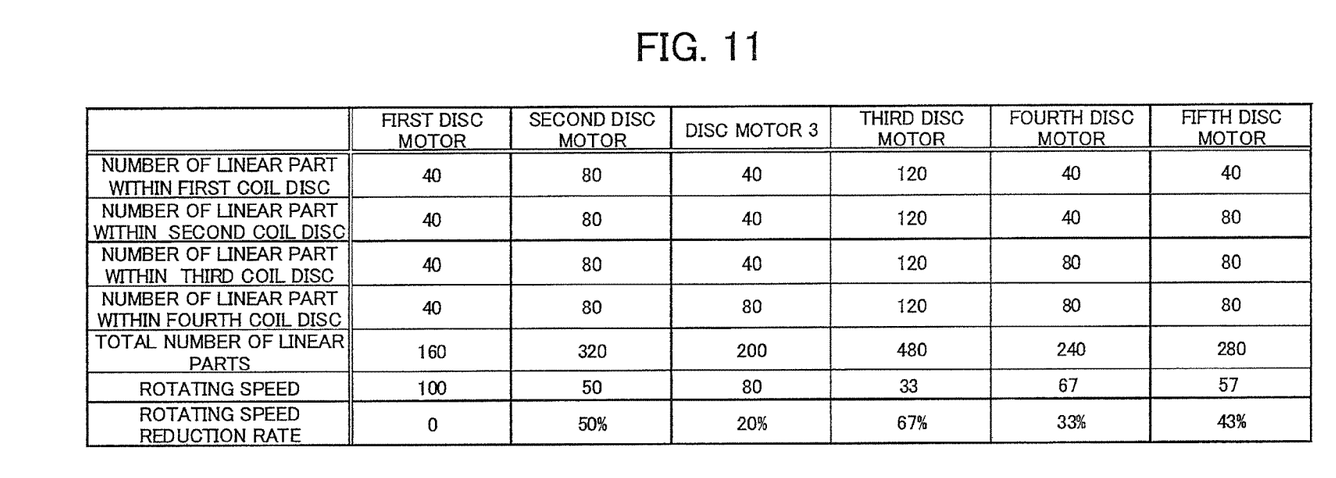
FIG. 11 is a table showing the relationship between coil patterns and rotating speeds of disc motors according to the first embodiment of the invention.

Next, the rotating speeds of the first disc motor, the second disc motor, the disc motor 3 of the embodiment, and third to fifth disc motors with different coil patterns (winding number of the coils 36B) will be described with reference to FIG. 11. Each of these disc motors has an eight-layer structure by laminating four coil discs. FIG. 11 shows a rotating speed and a rotating speed reduction rate of each disc motor, assuming that the rotating speed of the first disc motor is 100.

As described above, the second disc motor has twice the total number of the linear parts 36E on all of the eight layers than the first disc motor. Hence, the second disc motor has the rotating speed of 50 and the rotating speed reduction rate of 50%. In the conventional technique, the rotating speed of disc motor is changed by changing the coil pattern in the partial coils A on all the layers, e.g., by changing from that of the first disc motor to that of the second disc motor.

The rotating speed of disc motor may also be changed by changing the configuration of the disc motor from that of the first disc motor to the third disc motor according to the conventional technique. Specifically, the third disc motor is configured by laminating four coil discs 36A, each having two continuous coils 36B that extend all the way around the coil disc 36A three times. Hence, the third disc motor has the rotating speed of about 33 and the rotating speed reduction rate of about 67%. Thus, it is difficult to finely change the rotating speed according to the conventional technique in which coil patterns are changed on all layers.

On the other hand, the disc motor 3 of the embodiment has 40 linear parts 36E on each of the three coil discs 36A (having first to sixth layers) and 80 linear parts 36E on another coil disc 36A (having seventh and eighth layers), which gives the total of 200 linear parts 36E. Hence, the disc motor 3 has the rotating speed of 80 and the rotating speed reduction rate of 20%, which is less than the reduction rate resulting from the conventional technique. Accordingly, the present embodiment can enable a fine control of the rotating speed of disc motor.

The fourth disc motor is configured by laminating two first coil discs 36A and two second coil discs 36A, and has the rotating speed of about 67 and the rotating speed reduction rate of about 33%. The fifth disc motor is configured by laminating one first coil disc 36A and three second coil discs 36A, and has the rotating speed of about 57 and the rotating speed reduction rate of about 43%. In these cases also, the above effects of the embodiment can be achieved.

In this embodiment, the coil section 36 is symmetrical with respect to a center axis E (FIG. 5) that extends perpendicular to the output shaft 31 and through the center of the coil section 36 when the four coil discs 36A are laminated. More specifically, the one and the other ends 36F and 36G on a first one of the coil discs 36A are located in the regions 36*a*1 and 36*a*2; the one and the other ends 36F and 36G on a second one of the coil discs 36A are located in the regions 36*a*2 and 36*a*3; the one and the other ends 36F and 36G on a third one of the coil discs 36A are located in the regions 36*a*3 and 36*a*4; and the one and the other ends 36F and 36G on a fourth one of the coil discs 36A are located in the regions 36*a*4 and 36*a*1.

Figure 4:
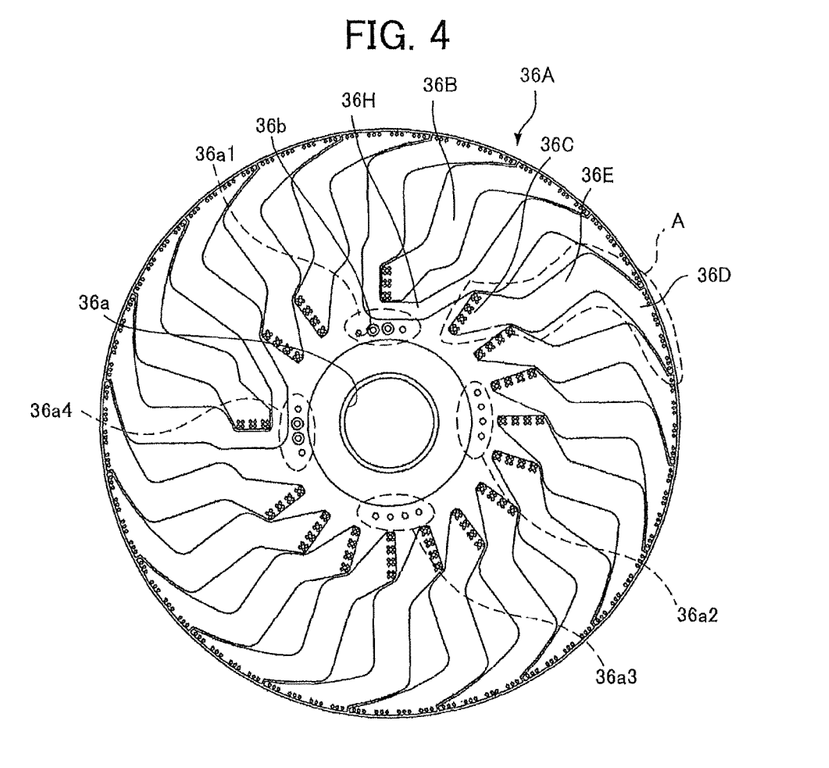
FIG. 4 is a plan view of a first coil disc according to the first embodiment of the invention.

FIG. 4 shows a direct connection part 36H, which is an inner connection part 36C within a partial coil A directly connected to another inner connection part 36C in a different partial coil A, located near each of the regions 36*a*1 and 36*a*4. Similarly to the above described one and the other ends 36F and 36G on each coil disc 36A, the direct connection part 36H is located near each of the regions 36*a*4 and 36*a*1 on the first one of the coil discs 36A; the direct connection part 36H is located near each of the regions 36*a*1 and 36*a*2 on the second one of the coil discs 36A; the direct connection part 36H is located near each of the regions 36*a*2 and 36*a*3 on the third one of the coil discs 36A; and the direct connection part 36H is located near each of the regions 36*a*3 and 36*a*4 on the fourth one of the coil discs 36A. The shape of the partial coil A other than the one end 36F, the other end 36G, and the direct connection part 36H is identical in each coil disc. The coil section 36 is therefore symmetrical about the center axis E when the four coil discs 36A are laminated. This structure can balance the weight of the rotor 32, preventing the disc motor 3 from jolting during operation.

According to the present embodiment, the number of the liner part 36E included in partial coils disposed across the paths of the fluxes generated by the magnets 41 can be freely changed by using the first and second coil discs 36A having different winding time of coils 36B around the coil disc 36A. Thus, it is possible to finely control the rotating speed of disc motor to improve the freedom in designing the disc motor.

Also, the coil 36B within the partial coil A that is wider than the coil 36B within the partial coil B has lower resistance and better radiation capability, increasing the output of the disc motor 3.

Figure 12:
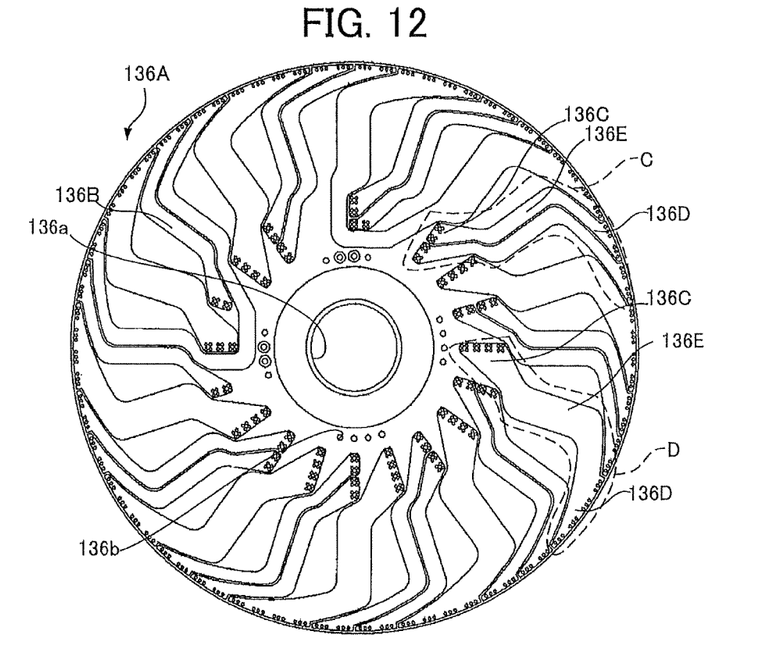
FIG. 12 is a plan view of a coil disc according to a second embodiment of the invention.

Next, a disc motor 103 according to a second embodiment of the invention will be described with reference to FIGS. 12 to 14. The second embodiment differs from the first embodiment in a partial coil on a coil disc 136A. The following description will only focus on the difference between the first and second embodiments.

Figure 13:
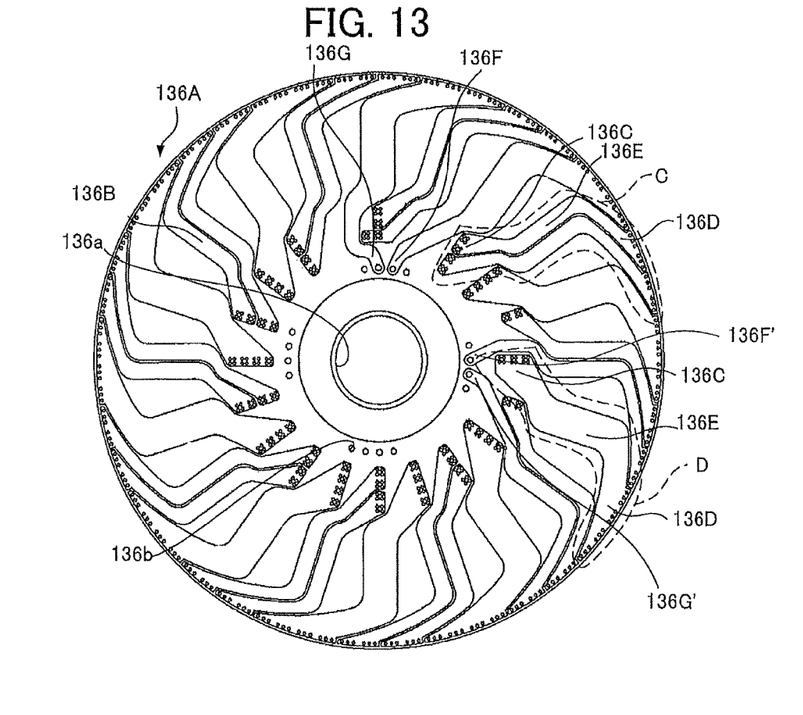
FIG. 13 is a rear view of the coil disc according to the second embodiment of the invention.

Two continuous coils 136B are disposed on the coil disc 136A and have one ends 136F, 136F' and the other ends 136G, 136G' as shown in FIG. 13. The coil disc 136A is defined with partial coils C and D, and is formed with a through hole 136*a* and connection holes 136*b* as in the first embodiment.

The partial coils C and D are disposed in alternation in a circumferential direction of the coil disc 136A. The coil 136B within each partial coil C, D is configured of an inner connection part 136C on a radially inner side, an outer connection part 136D on a radially outward side, and a linear part 136E extending linearly in the radial direction to connect the inner connection part 136C to the outer connection part 136D. The coils 136B on the upper and lower surfaces are connected to one another at the inner and outer connection parts 136C and 136D. The linear part 136E in each partial coils C corresponds to a second partial coil section of the invention. The linear part 136E in each partial coils D corresponds to a first partial coil section of the invention. The inner connection part 136C and the outer connection part 136D in each partial coils C correspond to a second connecting section of the invention. The inner connection part 136C and the outer connection part 136D in each partial coils D correspond to a first connecting section of the invention.

Each partial coil C has two coils 136B, and each partial coil D has one coil 136B. More specifically, the coil 136B configured of the plurality of partial coils C extends all the way around the coil disc 136A twice from the one end 136F' to the other end 136G'. On the other hand, the coil 136B configured of the plurality of partial coils D extends all the way around the coil disc 136A one time from the one end 136F to the other end 136G. Also, the coil 136B within the partial coil D is twice the width than that of the coil 136B within the partial coil C. This configuration provides 30 linear parts 136E on the upper surface of the coil disc 136A and another 30 linear parts 136E on the lower surface thereof, giving the total of 60 linear parts 136E on the coil disc 136A.

Figure 14:
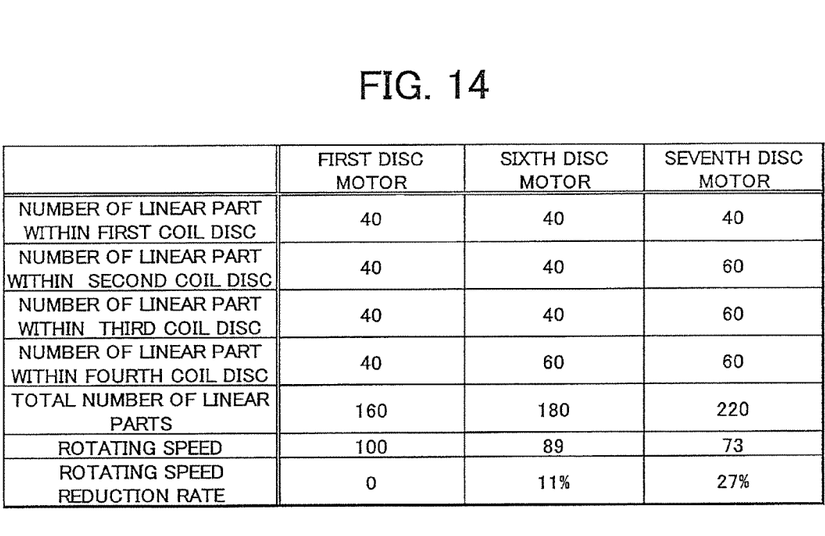
FIG. 14 is a table showing the relationship between coil patterns and rotating speeds of disc motors according to the second embodiment of the invention.

FIG. 14 is a table showing the rotating speed and the rotating speed reduction rate of each of the first disc motor, a sixth disc motor, and a seventh disc motor.

The sixth disc motor is configured by laminating three first coil discs 36A described in the first embodiment and one coil disc 136A of the second embodiment, and has the rotating speed of about 89 and the rotating speed reduction rate of about 11%. The seventh disc motor is configured by laminating one first coil disc 36A of the first embodiment and three coil discs 136A of the second embodiment, and has the rotating speed of about 73 and the rotating speed reduction rate of about 27%. Using the coil disc 136A of the second embodiment enables a fine control of the rotating speed of disc motor.

According to the second embodiment, the number of the linear part 136E included in partial coils disposed across the paths of the fluxes generated by the magnets 41 can be freely changed by using the coil disc 136A with the partial coils C and D having different winding time of coils 136B around the coil disc 136A. This enables even finer control of the rotating speed of disc motor than in the first embodiment, greatly improving the freedom in designing the disc motor. Also, the coil 36B within the partial coil D that is wider than the coil 36B within the partial coil C has lower resistance and better radiation capability, increasing the output of the disc motor 103.

Since the partial coils C and D are disposed in alternation and adjacent to one another in the second embodiment, this structure of the second embodiment can balance the weigh of the coil disc 136A on the whole, preventing the disc motor 103 from jolting during operation and facilitating balancing operation for the disc motor 103 and the like.

While the invention has been described in detail with reference to the embodiments thereof, it would be apparent to those skilled in the art that various changes and modifications may be made therein without departing from the spirit of the invention.

The coil section 36 of the above-described embodiments includes four coil discs 36A, 136A, but the number of the coil discs and the number of layers are not limited to those described above. For example, a coil section may include one coil disc only or more than four coil discs. The coil 36B is disposed on both the upper and lower surfaces of the coil disc 36A, 136A in the above-described embodiments to make two layers in the coil disc 36A, 136A. However, the coil 36B may be only disposed on either one of the upper and lower surfaces. This configuration further reduces the number of the linear parts 36E, 136E on the coil disc 36A, 136A, enabling further finer control over the rotating speed of the disc motor 3, 103.

In the first embodiment, the coil 36B extends all the way around the first coil disc 36A one time, and the coil 36B extends all the way around the second coil disc 36A two times. However, the winding time of the coil 36B is not limited thereto, provided that the winding time of the coil 36B differs between the first coil disc 36A and the second coil disc 36A.

In the above-described second embodiment, one of the coils 36B is wound around the coil disc 136A one time, and the other is wound two times. However, the winding time is not limited thereto, provided that the coils 36B are wound different times.

The coil disc 36A is provided with the two continuous coils 36B in the above embodiment, but the number of coils 36B is not limited thereto. For example, the coil disc 36A may be provided with three or more number of continuous coils 36B.

The partial coils A, B, C, and D of the above-described embodiments radiate outward in the radial direction of the through hole 36a, 136a, but this is not the limitation of the invention.

In the embodiments, the brushcutter 1 is described as an example of the electric working machine. However, the electric working machine of the invention may be any other power tool, provided that the power tool is equipped with the disc motor. For example, the invention is applicable to a thunder belt, a rotary hand saw, or other power tool equipped with the disc motor.

In the embodiments, the disc motor 3 has a pair of brushes 34. However, the present invention is not limited to this configuration. For example, a brushless motor is available.

What is claimed is:

1. A disc motor comprising:
   an output shaft;
   a coil disc that is substantially disc-shaped, the coil disc including a first coil and a second coil, the first coil having a plurality of first partial coil sections radiating outward in a radial direction of the output shaft and first connecting sections each connecting two first partial coil sections, the second coil having a plurality of second partial coil sections radiating outward in the radial direction and second connecting sections each connecting two second partial coil sections, a total number of the first partial coil sections being different from a total number of the second partial coil sections;
   an electric current supplying section configured to supply an electric current to the coil disc; and
   a magnet disposed in opposition to the first partial coil sections and the second partial coil sections,
   wherein each of the first partial coil sections and the second coil sections has a width in a circumferential direction of the coil disc, and the width of the first partial coil sections is different from the width of the second partial coil sections.

2. The disc motor according to claim 1, wherein the first partial coil sections and the second partial coil sections are alternately arranged adjacent to one another on the coil disc in a circumferential direction of the coil disc.

3. The disc motor according to claim 1, wherein the total number of the first partial coil sections is less than the total number of the second partial coil sections, and the width of the first partial coil sections is wider than the width of the second partial coil sections.

4. The disc motor according to claim 1, wherein the coil disc has first and second surfaces extending perpendicular to the output shaft, and the first coil and the second coil are formed on at least one of the first and second surfaces.

5. An electric working machine comprising a disc motor according to any one of claim 1-2 or 3-4.

6. A rotor used in a disc motor comprising:
   an output shaft; and
   a coil disc that is substantially disc-shaped, the coil disc including a first coil and a second coil, the first coil having a plurality of first partial coil sections radiating outward in a radial direction of the output shaft and first connecting sections each connecting two first partial coil sections, the second coil having a plurality of second partial coil sections radiating outward in the radial direction and second connecting sections each connecting two second partial coil sections, a total number of the first partial coil sections being different from a total number of the second partial coil sections,
   wherein each of the first partial coil sections and the second coil sections has a width in a circumferential direction of the coil disc, and the width of the first partial coil sections is different from the width of the second partial coil sections.

* * * * *